United States Patent
Wybenga et al.

(10) Patent No.: US 7,567,571 B2
(45) Date of Patent: *Jul. 28, 2009

(54) APPARATUS AND METHOD USING VECTOR TABLE INDIRECTION TO MAINTAIN FORWARDING TABLES IN A ROUTER

(75) Inventors: Jack C. Wybenga, Plano, TX (US); Patricia K. Sturm, Marion, IA (US); Patrick W. Ireland, Sanger, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 961 days.

This patent is subject to a terminal disclaimer.

(21) Appl. No.: 11/015,750

(22) Filed: Dec. 17, 2004
(Under 37 CFR 1.47)

(65) Prior Publication Data
US 2005/0265307 A1    Dec. 1, 2005

Related U.S. Application Data

(60) Provisional application No. 60/574,507, filed on May 26, 2004.

(51) Int. Cl.
    *H04L 12/28*     (2006.01)
    *H04L 12/56*     (2006.01)
(52) U.S. Cl. ................................. 370/395.32
(58) Field of Classification Search ................. 370/389, 370/400, 338, 406, 392, 408, 351, 356, 241, 370/256, 428, 395, 412, 419, 446, 401, 418; 709/238, 201, 245, 247, 206; 707/100–102, 707/2–4; 711/163
See application file for complete search history.

(56) References Cited

U.S. PATENT DOCUMENTS

| | | | | |
|---|---|---|---|---|
| 4,731,676 A | * | 3/1988 | Berlekamp | 360/26 |
| 5,088,091 A | * | 2/1992 | Schroeder et al. | 370/406 |
| 5,138,615 A | * | 8/1992 | Lamport et al. | 370/400 |
| 6,035,326 A | * | 3/2000 | Miles et al. | 709/206 |
| 6,426,957 B1 | * | 7/2002 | Hauser et al. | 370/413 |
| 6,636,499 B1 | * | 10/2003 | Dowling | 370/338 |
| 6,687,247 B1 | * | 2/2004 | Wilford et al. | 370/392 |
| 6,928,430 B1 | * | 8/2005 | Chien et al. | 707/3 |
| 6,985,483 B2 | * | 1/2006 | Mehrotra et al. | 370/389 |
| 7,180,887 B1 | * | 2/2007 | Schwaderer et al. | 370/351 |
| 7,185,159 B2 | * | 2/2007 | Beinet et al. | 711/163 |
| 7,349,415 B2 | * | 3/2008 | Rangarajan et al. | 370/408 |
| 7,356,033 B2 | * | 4/2008 | Basu et al. | 370/392 |
| 7,418,463 B2 | * | 8/2008 | Verma et al. | 707/202 |

(Continued)

*Primary Examiner*—Wing F Chan
*Assistant Examiner*—Prenell P Jones

(57) ABSTRACT

A router for interconnecting external devices comprising: 1) a switch fabric; and 2) R routing nodes coupled to the switch fabric. Each of the R routing nodes exchanges data packets with the external devices via network interface ports and with other routing nodes via the switch fabric. A first routing node comprises: i) an inbound network processor for receiving incoming data packets from a network interface port; ii) an outbound network processor for transmitting data packets to the network interface port; and iii) a shared memory accessible by the inbound and outbound network processors for storing a current trie tree search table and a current vector table used to index into the trie tree search table. A control plane processor generates an updated vector table to replace the current vector table and notifies the inbound and outbound network processors that the updated vector table is available.

20 Claims, 6 Drawing Sheets

U.S. PATENT DOCUMENTS

| | | | |
|---|---|---|---|
| 2002/0141403 A1* | 10/2002 | Akahane et al. | 370/389 |
| 2003/0091043 A1* | 5/2003 | Mehrotra et al. | 370/389 |
| 2004/0243563 A1* | 12/2004 | Heiner et al. | 707/3 |
| 2004/0249803 A1* | 12/2004 | Vankatachary et al. | 707/3 |
| 2005/0063407 A1* | 3/2005 | Wybenga et al. | 370/428 |
| 2005/0232264 A1* | 10/2005 | Wybenga et al. | 370/389 |
| 2006/0133389 A1* | 6/2006 | Wybenga et al. | 370/401 |
| 2006/0135167 A1* | 6/2006 | Wybenga et al. | 455/445 |

* cited by examiner

APPARATUS AND METHOD USING VECTOR TABLE INDIRECTION TO MAINTAIN FORWARDING TABLES IN A ROUTER

CROSS-REFERENCE TO RELATED APPLICATION AND CLAIM OF PRIORITY

The present invention is related to that disclosed in U.S. Provisional Patent Application Ser. No. 60/574,507, filed May 26, 2004, entitled "Vector Table Indirection for Dynamic Forwarding Table Maintenance". U.S. Provisional Patent Application Ser. No. 60/574,507 is assigned to the assignee of the present application. The subject matter disclosed in U.S. Provisional Patent Application Ser. No. 60/574,507 is hereby incorporated by reference into the present disclosure as if fully set forth herein. The present invention hereby claims priority under 35 U.S.C. §119(e) to U.S. Provisional Patent Application Ser. No. 60/574,507.

TECHNICAL FIELD OF THE INVENTION

The present invention is generally directed to distributed architecture routers and, in particular, to a mechanism for building forwarding tables and supporting high-speed forwarding table lookups in a massively parallel router.

BACKGROUND OF THE INVENTION

There has been explosive growth in Internet traffic due to the increased number of Internet users, various service demands from those users, the implementation of new services, such as voice-over-IP (VoIP) or streaming applications, and the development of mobile Internet. Conventional routers, which act as relaying nodes connected to sub-networks or other routers, have accomplished their roles well, in situations in which the time required to process packets, determine their destinations, and forward the packets to the destinations is usually smaller than the transmission time on network paths. More recently, however, the packet transmission capabilities of high-bandwidth network paths and the increases in Internet traffic have combined to outpace the processing capacities of conventional routers.

This has led to the development of massively parallel, distributed architecture routers. A distributed architecture router typically comprises a large number of routing nodes that are coupled to each other via a plurality of switch fabric modules and an optional crossbar switch. Each routing node has its own routing (or forwarding) table for forwarding data packets via other routing nodes to a destination address.

Traditionally, a single processor is used to forward all packets in a router or switch. Even in routers with multiple forwarding table lookup threads, these threads are under control of a single processor and use a single forwarding table. This is true even in routers that use multiple routing nodes, since a single forwarding table and control processor are used in each node.

In order to achieve higher throughput speeds, some routers may use two forwarding tables. One forwarding table is used to perform searches while the second table is updated with new routes. After a defined time period, the router switches from one table to the other. However, using a single forwarding processor creates problems in building and switching to new forwarding tables without impeding traffic flow. Some conventional systems simply drop packets during table changes.

Two methods may be used to avoid dropping packets. In one method, the router buffers data packets and forwards them after the switch. The other method uses two tables, where one table is written while the other table is read for forwarding lookups. The workload on the control plane processor in building and writing the forwarding tables is significant.

However, it is not possible to meet the 10 Gigabit per second (Gbps) forwarding speeds of newer networks using traditional router architectures. This problem is aggravated by the longer searches needed to support the larger address space of IPv6. Memory bandwidth and processing speed limitations prevent support of high data rates and deep trie tree searches. Dropping packets is unacceptable, especially with high data rates and large tables, where vast quantities of packets would be dropped during the switch. Buffering data packets is impractical due to the extremely large quantities of fast memory that would be required by the high data rate. Even if two tables are used, the traditional method of building and/or writing the tables for each processor puts a heavy load on the control plane processor, due to the complexity of the distribution of the forwarding process among network processors, microengines, and threads.

The Applicants disclosed an apparatus and a related method for maintaining high-speed lookup tables in U.S. patent application Ser. No. 10/860,691, entitled "Apparatus and Method for Maintaining High-Speed Forwarding Tables in a Massively Parallel Router", and filed on Jun. 3, 2004. The subject matter disclosed in U.S. patent application Ser. No. 10/860,691 is hereby incorporated by reference into the present disclosure as if fully set forth herein. The router disclosed in U.S. patent application Ser. No. 10/860,691 implemented a plurality of routing nodes, wherein each routing node used an inbound network processor to forward received data packets from external interfaces to a switch fabric and an outbound network processor to forward received data packets from the switch fabric to the external interface.

The inbound and outbound network processors in U.S. patent application Ser. No. 10/860,691 used a shared search table or forwarding table to forward data packets. The shared search table was implemented in a field programmable gate array (FPGA) complex and used a vector table to index into a trie tree search table. The shared search table was split into an upper memory bank and a lower memory bank. The microengines of the inbound and outbound network processors used one memory bank to perform lookup operations while a control plane processor of the inbound network processor updated the other memory bank with route information. The microengines would then be periodically switched over to the updated memory bank using a polling table swap mechanism.

One disadvantages of the polling table swap mechanism discussed in U.S. patent application Ser. No. 10/860,691 is that the base address of the vector tables must be at a fixed memory location. Another disadvantage is that the reader thread in each network processor must maintain state information on the FPGA state register. Another disadvantage is that both the inbound and outbound network processors must contend for access to the FPGA state register.

Therefore, there is a need in the art for an improved high-speed router that is capable of switching between split halves of a search table without using the polling table method described above. In particular, there is a need in the art for a high-speed router in which the vector tables used to index into a trie tree search table are not required to be a fixed location.

SUMMARY OF THE INVENTION

The present invention provides a mechanism for handling forwarding table swaps that does not require fixing the locations of the vector tables in memory. The present invention may be used with the dynamic forwarding table maintenance apparatus and method disclosed in U.S. patent application Ser. No. 10/860,691, filed on Jun. 3, 2004. The present invention provides an alternative to the polling table swap mechanism disclosed in U.S. patent application Ser. No. 10/860, 691.

The present invention provides an address passing table swap mechanism that passes the address of the new vector table to the reader thread in each network processor, thereby eliminating the need to monitor the FPGA state register. The present invention also allows the vector table to be placed anywhere in memory and to be moved between updates. Since the FPGA is no longer monitored, the need to keep state information and the monitoring contention are eliminated.

Accordingly, to address the above-discussed deficiencies of the prior art, it is a primary object of the present invention to provide a router for interconnecting external devices coupled to the router. According to an advantageous embodiment of the present invention, the router comprises: 1) a switch fabric; and 2) R routing nodes coupled to the switch fabric, wherein each of the R routing nodes is capable of exchanging data packets with the external devices via network interface ports and with other ones of the R routing nodes via the switch fabric. A first of the R routing nodes comprises: i) an inbound network processor capable of receiving incoming data packets from a network interface port; ii) an outbound network processor capable of transmitting data packets to the network interface port; and iii) a shared memory accessible by the inbound and outbound network processors for storing a current trie tree search table and a current vector table used to index into the current trie tree search table. A control plane processor associated with the first routing node generates an updated vector table to replace the current vector table and notifies the inbound and outbound network processors that the updated vector table is available.

According to one embodiment of the present invention, the control plane processor notifies the inbound and outbound network processors that the updated vector table is available by sending an updated vector table address associated with the updated vector table to the inbound and outbound network processors.

According to another embodiment of the present invention, a first microengine in the inbound network processor determines that the updated vector table address is different than a current vector table address associated with the current vector table and, in response to the determination, uses the updated vector table identified by the updated vector table address to index into an updated trie tree search table.

According to still another embodiment of the present invention, the first microengine executes a reader thread that determines that the updated vector table address is different than the current vector table address and, in response to the determination, causes a plurality of forwarding threads associated with the inbound network processor to use the updated vector table to index into the updated trie tree search table.

According to yet another embodiment of the present invention, a second microengine in the inbound network processor determines that the plurality of forwarding threads are using the updated vector table to index into the updated trie tree search table and, in response to the determination, notifies the control plane processor that the plurality of microengines are using the updated vector table and the updated trie tree search table to forward data packets.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged packet switch or router.

Figure 1:
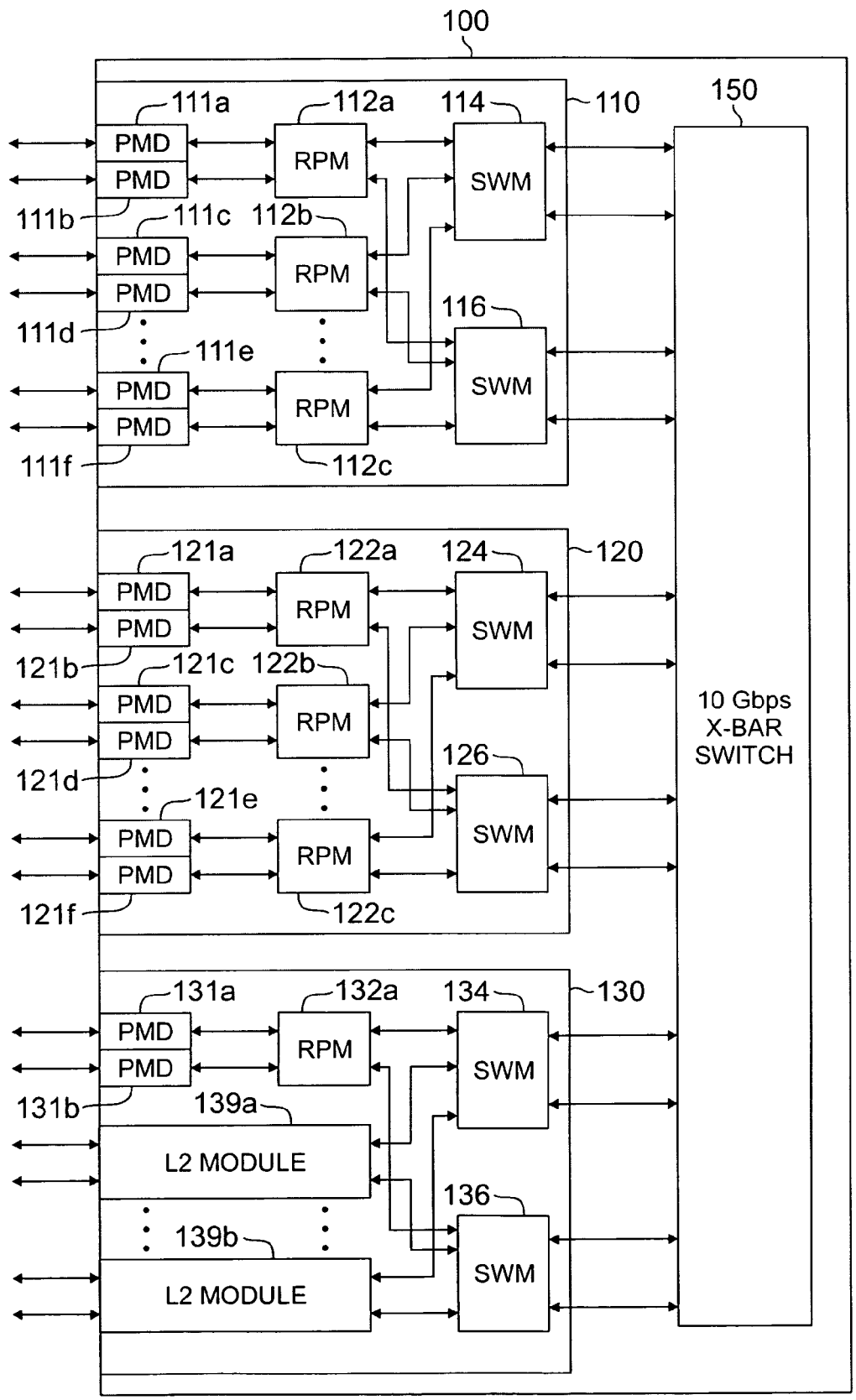
FIG. 1 illustrates an exemplary distributed architecture router, which performs forwarding table processing according to the principles of the present invention.

FIG. 1 illustrates exemplary distributed architecture router 100, which performs forwarding table processing using an address passing table swap technique according to the principles of the present invention. Router 100 supports Layer 2 switching and Layer 3 switching and routing. Thus, router 100 functions as both a switch and a router. However, for simplicity, router 100 is referred to herein simply as a router. The switch operations are implied.

According to the exemplary embodiment, router 100 comprises N rack-mounted shelves, including exemplary shelves 110, 120 and 130, which are coupled via crossbar switch 150. In an advantageous embodiment, crossbar switch 150 is a 10 Gigabit Ethernet (10 GbE) crossbar operating at 10 gigabits per second (Gbps) per port.

Each of exemplary shelves 110, 120 and 130 may comprise route processing modules (RPMs) or Layer 2 (L2) modules, or a combination of route processing modules and L2 modules. Route processing modules forward data packets using primarily Layer 3 information (e.g., Internet protocol (IP) addresses). L2 modules forward data packets using primarily Layer 2 information (e.g., medium access control (MAC) addresses). For example, the L2 modules may operate on Ethernet frames and provide Ethernet bridging, including VLAN support. The L2 modules provide a limited amount of Layer 3 forwarding capability with support for small forwarding tables of, for example, 4096 routes.

In the exemplary embodiment shown in FIG. 1, only shelf 130 is shown to contain both route processing (L3) modules and L2 modules. However, this is only for the purpose of simplicity in illustrating router 100. Generally, it should be understood that many, if not all, of the N shelves in router 100 may comprise both RPMs and L2 modules.

Exemplary shelf 110 comprises a pair of redundant switch modules, namely primary switch module (SWM) 114 and secondary switch module (SWM) 116, a plurality of route processing modules 112, including exemplary route processing module (RPM) 112a, RPM 112b, and RPM 112c, and a plurality of physical media device (PMD) modules 111, including exemplary PMD modules 111a, 111b, 111c, 111d, 111e, and 111f. Each PMD module 111 transmits and receives data packets via a plurality of data lines connected to each PMD module 111.

Similarly, shelf 120 comprises a pair of redundant switch modules, namely primary SWM 124 and secondary SWM 126, a plurality of route processing modules 122, including RPM 122a, RPM 122b, and RPM 122c, and a plurality of physical media device (PMD) modules 121, including PMD modules 121a-121f. Each PMD module 121 transmits and receives data packets via a plurality of data lines connected to each PMD module 121.

Additionally, shelf 130 comprises redundant switch modules, namely primary SWM 134 and secondary SWM 136, route processing module 132a, a plurality of physical media device (PMD) modules 131, including PMD modules 131a and 131b, and a plurality of Layer 2 (L2) modules 139, including L2 module 139a and L2 module 139b. Each PMD module 131 transmits and receives data packets via a plurality of data lines connected to each PMD module 131. Each L2 module 139 transmits and receives data packets via a plurality of data lines connected to each L2 module 139.

Router 100 provides scalability and high-performance using up to M independent routing nodes (RN). A routing node comprises, for example, a route processing module (RPM) and at least one physical medium device (PMD) module. A routing node may also comprise an L2 module (L2M). Each route processing module or L2 module buffers incoming Ethernet frames, Internet protocol (IP) packets and MPLS frames from subnets or adjacent routers. Additionally, each RPM or L2M classifies requested services, looks up destination addresses from frame headers or data fields, and forwards frames to the outbound RPM or L2M. Moreover, each RPM (or L2M) also maintains an internal routing table determined from routing protocol messages, learned routes and provisioned static routes and computes the optimal data paths from the routing table. Each RPM processes an incoming frame from one of its PMD modules. According to an advantageous embodiment, each PMD module encapsulates an incoming frame (or cell) from an IP network (or ATM switch) for processing in a route processing module and performs framing and bus conversion functions.

Incoming data packets may be forwarded within router 100 in a number of different ways, depending on whether the source and destination ports are associated with the same or different PMD modules, the same or different route processing modules, and the same or different switch modules. Since each RPM or L2M is coupled to two redundant switch modules, the redundant switch modules are regarded as the same switch module. Thus, the term "different switch modules" refers to distinct switch modules located in different ones of shelves 110, 120 and 130.

In a first type of data flow, an incoming data packet may be received on a source port on PMD module 121f and be directed to a destination port on PMD module 131a. In this first case, the source and destination ports are associated with different route processing modules (i.e., RPM 122c and RPM 132a) and different switch modules (i.e., SWM 126 and SWM 134). The data packet must be forwarded from PMD module 121f all the way through crossbar switch 150 in order to reach the destination port on PMD module 131a.

In a second type of data flow, an incoming data packet may be received on a source port on PMD module 121a and be directed to a destination port on PMD module 121c. In this second case, the source and destination ports are associated with different route processing modules (i.e., RPM 122a and RPM 122b), but the same switch module (i.e., SWM 124). The data packet does not need to be forwarded to crossbar switch 150, but still must pass through SWM 124.

In a third type of data flow, an incoming data packet may be received on a source port on PMD module 111c and be directed to a destination port on PMD module 111d. In this third case, the source and destination ports are associated with different PMD modules, but the same route processing module (i.e., RPM 112b). The data packet must be forwarded to RPM 112b, but does not need to be forwarded to crossbar switch 150 or to switch modules 114 and 116.

Finally, in a fourth type of data flow, an incoming data packet may be received on a source port on PMD module 111a and be directed to a destination port on PMD module 111a. In this fourth case, the source and destination ports are associated with the same PMD module and the same route-processing module (i.e., RPM 112a). The data packet still must be forwarded to RPM 112a, but does not need to be forwarded to crossbar switch 150 or to switch modules 114 and 116.

Figure 2:
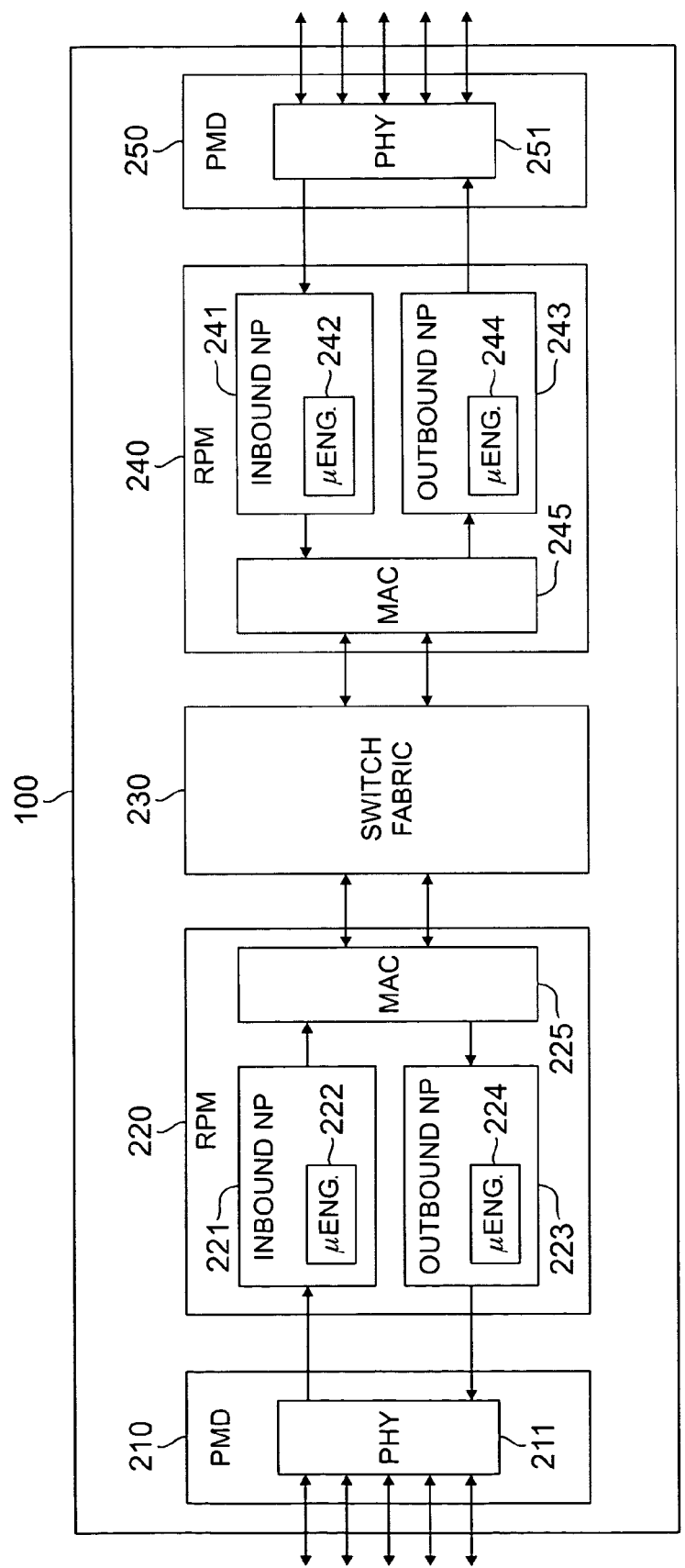
FIG. 2 illustrates selected portions of the exemplary router according to one embodiment of the present invention.

FIG. 2 illustrates selected portions of exemplary router 100 in greater detail according to one embodiment of the present invention. FIG. 2 simplifies the representation of some of the elements in FIG. 1. Router 100 comprises PMD modules 210 and 250, route processing modules 220 and 240, and switch fabric 230. PMD modules 210 and 250 are intended to represent any of PMD modules 111, 121, and 131 shown in FIG. 1. Route processing modules 220 and 240 are intended to represent any of RPM 112, RPM 122, and RPM 132 shown in FIG. 1. Switch fabric 230 is intended to represent crossbar switch 150 and the switch modules in shelves 110, 120 and 130 in FIG. 1.

PMD module 210 comprises physical (PHY) layer circuitry 211, which transmits and receives data packets via the external ports of router 100. PMD module 250 comprises physical (PHY) layer circuitry 251, which transmits and receives data packets via the external ports of router 100. RPM 220 comprises inbound network processor (NP) 221, outbound network processor (NP) 223, and medium access controller (MAC) layer circuitry 225. RPM 240 comprises inbound network processor (NP) 241, outbound network processor (NP) 243, and medium access controller (MAC) layer circuitry 245.

Each network processor comprises a plurality of microengines capable of executing threads (i.e., code) that forward data packets in router 100. Inbound NP 221 comprises N microengines (μEng.) 222 and outbound NP 223 comprises N microengines (μEng.) 224. Similarly, inbound NP 241 comprises N microengines (μEng.) 242 and outbound NP 243 comprises N microengines (μEng.) 244.

Two network processors are used in each route-processing module to achieve high-speed (i.e., 10 Gbps) bi-directional operations. Inbound network processors (e.g., NP 221, NP 241) operate on inbound data (i.e., data packets received from the network interfaces and destined for switch fabric 230). Outbound network processors (e.g., NP 223, NP 243) operate on outbound data (i.e., data packets received from switch fabric 230 and destined for network interfaces).

According to an exemplary embodiment of the present invention, each network processor comprises N=16 microengines that perform data plane operations, such as data packet forwarding. Each RPM also comprises a control plane processor (not shown) that performs control plane operations, such as building forwarding (or look-up) tables. According to the exemplary embodiment, each microengine supports eight threads. At least one microengine is dedicated to reading inbound packets and at least one microengine is dedicated to writing outbound packets. The remaining microengines are used for forwarding table lookup operations.

In order to meet the throughput requirements for line rate forwarding at data rates up to 10 Gbps, it is necessary to split the data plane processing workload among multiple processors, microengines, and threads. The first partitioning splits the workload between two network processors—one operating on inbound data packets from the network interfaces to the switch and the other operating on outbound data packets from the switch to the network interfaces. Each of these processors uses identical copies of the forwarding table.

According to an exemplary embodiment of the present invention, the control and management plane functions (or operations) of router 100 may be distributed between inbound (IB) network processor 221 and outbound network processor 223. The architecture of router 100 allows distribution of the control and management plane functionality among many processors. This provides scalability of the control plane in order to handle higher control traffic loads than traditional routers having only a single control plane processor. Also, distribution of the control and management plane operations permits the use of multiple low-cost processors instead of a single expensive processor. For simplicity in terminology, control plane functions (or operations) and management plane functions (or operations) may hereafter be collectively referred to as control plane functions.

Figure 3:
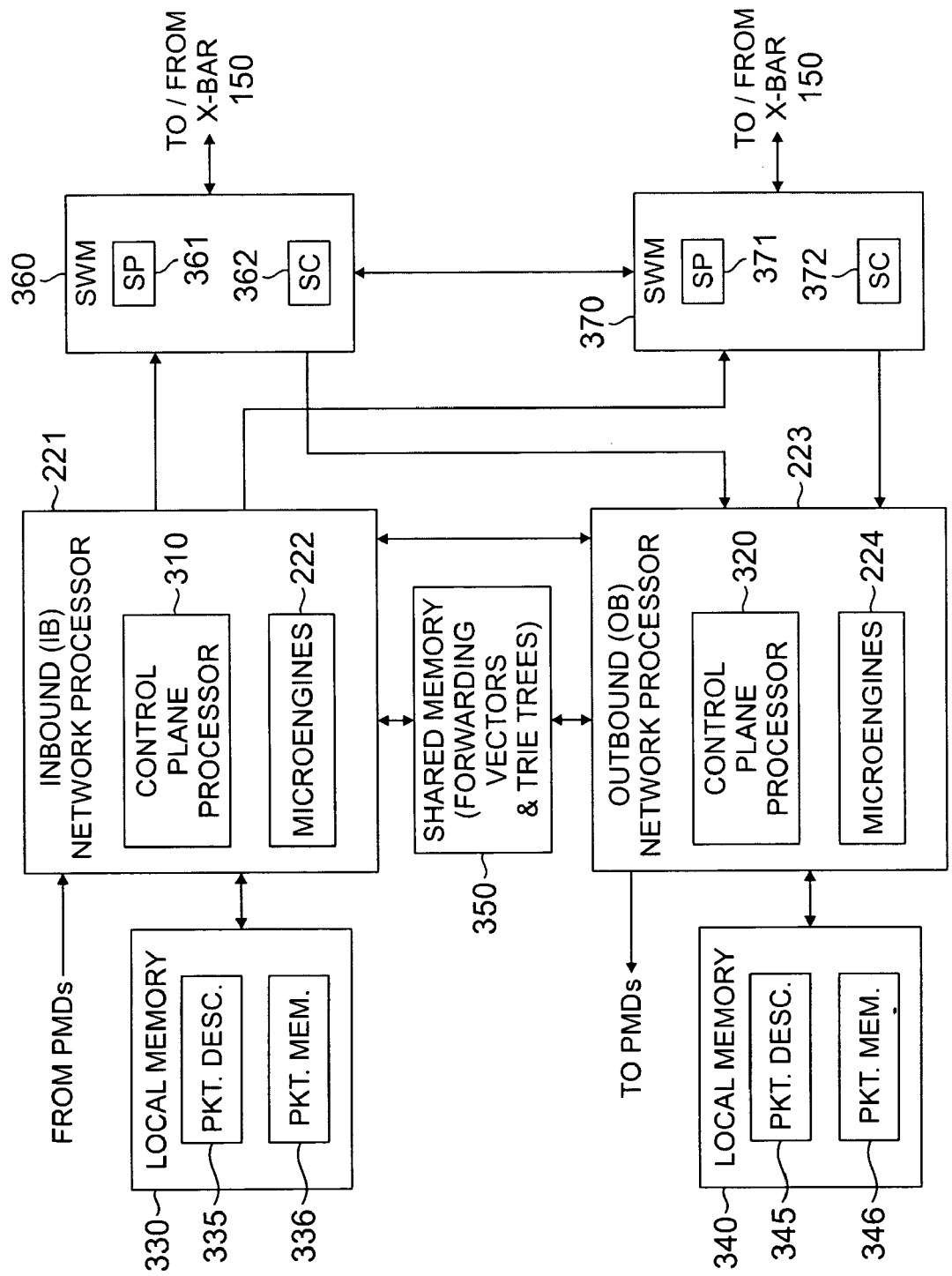
FIG. 3 illustrates the inbound and outbound network processors according to one embodiment of the present invention.

FIG. 3 illustrates inbound network processor 221 and outbound network processor 223 in greater detail according to an exemplary embodiment of the present invention. Inbound (IB) network processor 221 comprises control plane processor 310 and microengine(s) 222. Outbound (OB) network processor 223 comprises control plane processor 320 and microengine(s) 224. Inbound network processor 221 and outbound network processor 223 are coupled to shared memory 350, which stores forwarding table information, including forwarding vectors and trie tree search tables.

Inbound network processor 221 is coupled to local memory 330, which contains packet descriptors 335 and packet memory 336. Outbound network processor 223 is coupled to local memory 340, which contains packet descriptors 345 and packet memory 346.

Control and management messages may flow between the control and data planes via interfaces between the control plane processors and data plane processors. For example, control plane processor 310 may send control and management messages to the microengines 222 and control plane processor 320 may send control and management messages to the microengines 224. The microengines can deliver these packets to the local network interfaces or to other RPMs for local consumption or transmission on its network interfaces. Also, the microengines may detect and send control and management messages to their associated control plane processor for processing. For example, microengines 222 may send control and management plane messages to control plane processor 310 and microengines 224 may send control and management messages to control plane processor 320.

Inbound network processor 221 operates under the control of control software (not shown) stored in memory 330. Similarly, outbound network processor 223 operates under the control of control software (not shown) stored in memory 340. According to an exemplary embodiment of the present invention, the control software in memories 330 and 340 may be identical software loads.

Network processors 221 and 223 in router 100 share routing information in the form of aggregated routes stored in shared memory 350. Management and routing functions of router 100 are implemented in inbound network processor 221 and outbound network processor 223 in each RPM of router 100. Network processors 221 and 223 are interconnected through 10 Gbps optical links to exemplary switch module (SWM) 360 and exemplary switch module (SWM) 370. SWM 360 comprises switch processor 361 and switch controller 362. SWM 370 comprises switch processor 371 and switch controller 372. Multiple switch modules may be interconnected through 10 Gbps links via Rack Extension Modules (REXMs) (not shown).

In order to meet the bi-directional 10 Gbps forwarding throughput of the RPMs, two network processors—one inbound and one outbound—are used in each RPM. Inbound network processor 221 handles inbound (IB) packets traveling from the external network interfaces to switch fabric 230. Outbound network processor 223 handles outbound (OB) packets traveling from switch fabric 230 to the external network interfaces. In an exemplary embodiment of the present invention, control plane processor (CPP) 310 comprises an XScale core processor (XCP) and microengines 222 comprise sixteen microengines. Similarly, control plane processor (CPP) 320 comprises an XScale core processor (XCP) and microengines 224 comprise sixteen microengines.

According to an exemplary embodiment of the present invention, router 100 implements a routing table search circuit as described in U.S. patent application Ser. No. 10/794,506, filed on Mar. 5, 2004, entitled "Apparatus and Method for Forwarding Mixed Data Packet Types in a High-Speed Router." The disclosure of U.S. patent application Ser. No. 10/794,506 is hereby incorporated by reference in the present application as if fully set forth herein. The routing table search circuit comprises an initial content addressable memory (CAM) stage followed by multiple trie tree search table stages. The CAM stage allows searches to be performed on data packet header information other than regular address bits, such as, for example, class of service (COS) bits, packet type bits (IPv4, IPv6, MPLS), and the like.

The use of multiple threads in multiple microengines enables network processors 221 and 223 to modify a data packet during its transit through router 100. Thus, network processors 221 and 223 may provide network address translation (NAT) functions that are not present in conventional high-speed routers. This, in turn, provides dynamic address assignment to nodes in a network. Since network processors 221 and 223 are able to modify a data packet, network processors 221 and 223 also are able to obscure the data packet identification. Obscuring packet identification allows router 100 to provide complete anonymity relative to the source of an inbound packet.

The ability of router 100 to distribute the data packet workload over thirty-two microengines, each capable of executing, for example, eight threads, enables router 100 to perform additional security and classification functions at line rates up to 10 Gbps. FIG. 3 shows the flow of data through route processing module (RPM) 220. Packets enter RPM 220 through an interface—a network interface (PMD) for inbound network processor (IB NP) 221 and a switch interface for outbound network processor (OB NP) 223. IB NP 221 and OB NP 223 also may receive packets from control plane processors 310 and 320.

Microengines 222 store these data packets in packet memory 336 in local QDRAM (or RDRAM) memory 330 and write a Packet Descriptor into packet descriptors 335 in local memory 330. Similarly, microengines 224 store these data packets in packet memory 346 in local QDRAM (or RDRAM) memory 340 and write a Packet Descriptor into packet descriptors 345 in local memory 340.

A CAM search key is built for searching the initial CAM stages of the search tables in memory 350. The CAM key is built from data packet header information, such as portions of the destination address and class of service (CoS) information and a CAM lookup is done. The result of this lookup gives an index for a Vector Table Entry, which points to the start of a trie tree search table. Other information from the packet header, such as the rest of the destination address and possibly a socket address, are used to traverse the trie tree search table.

The search of the CAM stage and trie tree table results in either in a leaf or an invalid entry. Unresolved packets are either dropped or sent to control plane processors 310 and 320 for further processing. A leaf node gives a pointer to an entry in a forwarding table (i.e., a Forwarding Descriptor) in memory 350. Since shared memory space is limited, these forwarding tables may be located in local memory 330 and 340. Based on the results of the search, the packet is forwarded to the control plane, to another RPM network processor, to an L2 module, or to an output port (i.e., a switch port for IB NP 221 and a network interface port for OB NP 223). The data packet is not copied as it is passed from microengine thread to microengine thread. Only the pointer to the Packet Descriptor must be passed internally. This avoids expensive copies.

In the exemplary embodiment of router 100, a control plane processor (CCP) builds the forwarding tables. In particular, CCP 310 in inbound network processor 221 builds the forwarding tables. Forwarding table lookup operations are done by micro-engines 222 and 224 of IB NP 221 and OB NP 223, operating in the data plane. In order to meet 10 Gbps throughput requirements, contention between accesses to the forwarding tables by IB NP 221 and OB NP 223 must be avoided. This is accomplished by giving each network processor a dedicated bank of memory (i.e., QDRAM) for forwarding tables. The same forwarding table is written to a shared QDRAM for both IB NP 221 and OB NP 223. Each network processor reads its own portion of shared QDRAM, thus avoiding read contention between IB NP 221 and OB NP 223.

Figure 4:
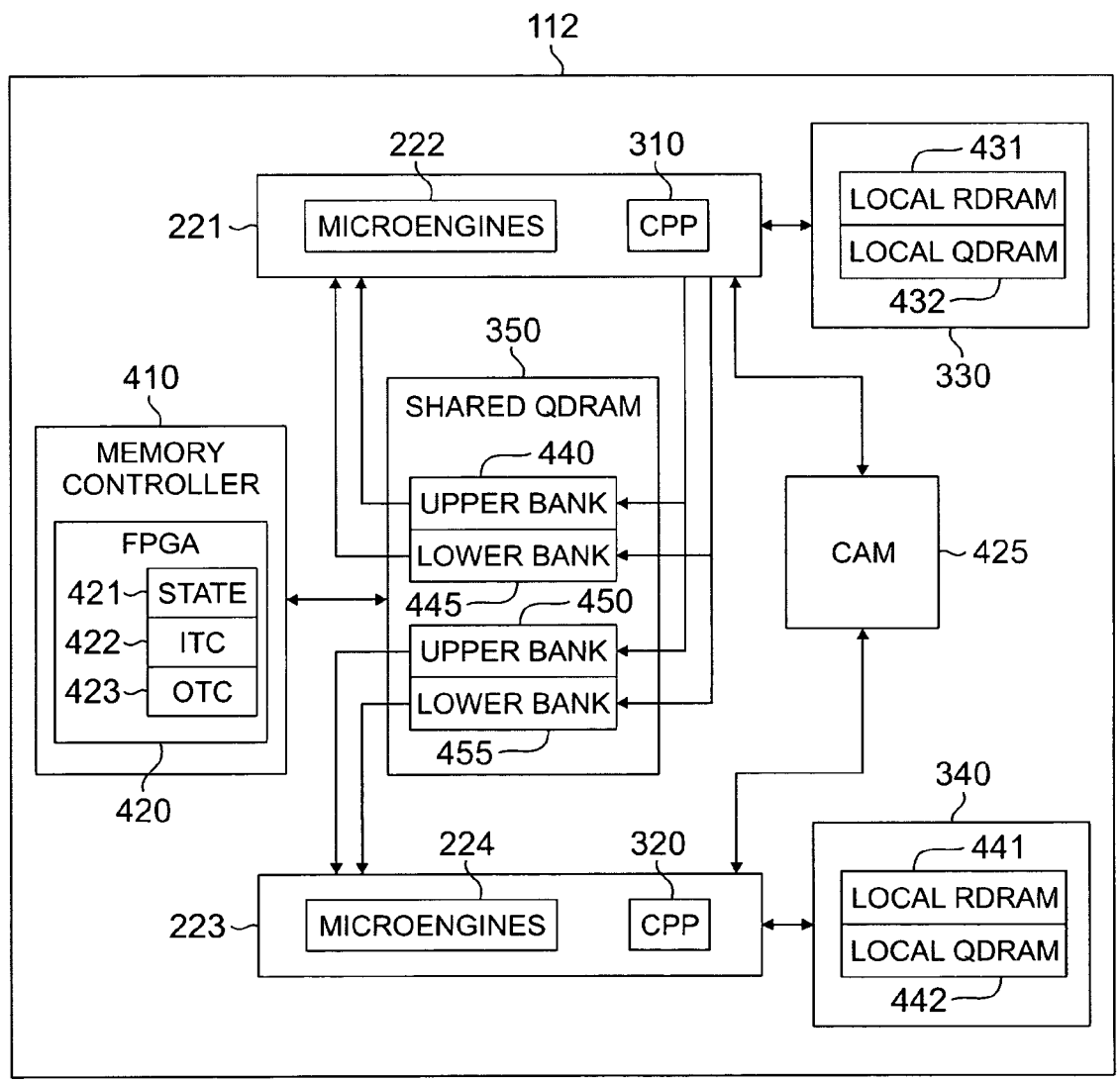
FIG. 4 illustrates selected portions of the forwarding tables architecture in greater detail according to an exemplary embodiment of the present invention.

FIG. 4 illustrates selected portions of the forwarding tables architecture in RPM 112 in greater detail according to an exemplary embodiment of the present invention. Shared memory 350 comprises inbound upper bank 440, inbound lower bank 445, outbound upper bank 450, and outbound lower bank 455. Local memory 330 comprises local RDRAM 431 and local QDRAM 432. Local memory 340 comprises local RDRAM 441 and local QDRAM 442. RPM 112 also comprises content addressable memory (CAM) 425 and memory controller 410. Memory controller 410 comprises field programmable gate array (FPGA) 420, which stores state register 421, inbound transition complete (ITC) indicator 422, and outbound transition complete (OTC) indicator 423.

Inbound network processor 221 runs the routing protocols, so IB NP 221 is selected to build the forwarding tables. The forwarding tables must be updated periodically, for example, once every 100 milliseconds. Building a forwarding table is a long process and the packet data rate is very high. Thus, it is not practical to stop packet flow while the forwarding tables are being built or updated. Thus, in an advantageous embodiment, router 100 implements two banks of QDRAM for each of network processors 221 and 223. IB NP 221 uses inbound upper bank 440 and inbound lower bank 445 and OB NP 223 uses outbound upper bank 450, and outbound lower bank 455. One QDRAM bank is written while the other QDRAM bank is read. To speed forwarding table construction and to reduce the workload on IB NP 221, forwarding table writes by IB NP 221 are automatically written to both the inbound and outbound shared QDRAM simultaneously.

As described above, multiple microengines and threads are involved in forwarding table lookup operations. A thread can only transition to a new forwarding table between data packets. Since packet processing within IB NP 221 and OB NP 223 is not synchronized and search depth varies from data packet to data packet, not all threads change tables at the same time. This is aggravated by the fact that microengines 222 and 224, located in different network processors, use the tables. Throughput requirements do not allow threads to halt until all threads have transitioned to a new set of tables. Therefore, there is a transition period where some threads use the old set of tables and others use the new set of tables. During this transition period, both the upper and lower banks of the shared QDRAM of each network processor must be accessible by the microengines for read access.

There are four states for the shared QDRAM selected by state register 421 in FPGA 420: 1) Uninitialized; 2) Transition Period; 3) Upper Forwarding Table Active; and 4) Lower Forwarding Table Active. If state register 421 is in the Initialized state, there are no valid forwarding tables for microengines 222 and 224 to use for forwarding packets. If state register 421 is in the Transition Period state, each network processor has read access to both its upper and lower shared QDRAM banks. Write access is optional, but not necessary since software should not be writing forwarding tables during this time period.

If state register 421 is in the Upper Forwarding Table Active state, each network processor has read access to its own upper bank. Control plane processor (CPP) 310 in IB NP 221 has simultaneous write access to both inbound lower bank 445 and outbound lower bank 455 of shared QDRAM memory 350. These are the only access modes required. Any other access, such as write access by each processor to its own upper bank, is optional.

If state register 421 is in the Lower Forwarding Table Active state, each network processor has read access to its own lower bank. Control plane processor (CPP) 310 in IB NP 221 has simultaneous write access to both inbound upper bank 440 and outbound upper bank 450 of shared QDRAM memory 350. These are the only access modes required. Any other access, such as write access by each processor to its own lower bank, is optional.

FPGA 420 initializes the memory state in state register 421 to [00] (i.e., uninitialized) and clears Inbound Transition Complete (ITC) indicator 422 and Outbound Transition Complete (OTC) indicator 423. This is an indication to microengines 222 and 224 that there are no valid tables for forwarding packets. CPP 310 controls the memory state transitions. In this example, the IB NP 221 writes the upper banks first.

CPP 310 begins by selecting inbound upper bank 440 and outbound upper bank 450 for write. To do this, CPP 310 sets the memory state to [01] (i.e., Lower Forwarding Table Active) to begin writing the upper banks. This is a signal to FPGA 420 to give IB NP 221 simultaneous write access to the upper memory banks of shared memory 350. CPP 310 then builds the forwarding tables in the upper banks.

When the forwarding table is complete, CP 310 changes the memory state to [10] (i.e., Upper Forwarding Table Active), allowing CPP 310 to have simultaneous write access to the lower memory banks of shared memory 350. This is a signal to the hardware to swap write access from upper banks 440 and 450 to lower banks 445 and 455 of memory 350. Microengines 222 and 224 do not start forwarding packets until the second state change (i.e., until the state is [10]). At this point, microengines 222 and 224 read the forwarding tables in their upper banks, CPP 310 writes tables to the lower banks, and normal forwarding table update processing begins.

In normal forwarding table update processing, when IB NP 221 is done writing a bank of tables, IB NP 221 sets the memory state to [11], indicating a transition period and clears both ITC indicator 422 and OTC indicator 423 in FPGA 420. At this point, FPGA 420 gives microengines 222 and 224 read access to both the upper and lower memory banks. No forwarding table writing takes place during this transition period. The microengine reader function sees the state change and informs each microengine forwarding thread of the table change. Each forwarding thread examines the table change indicator with the start of each new packet, transitions to the new forwarding table when commanded, and updates its transition status when the transition has occurred.

Forwarding threads that are not assigned work continually scan the table change indicators in order to track the bank changes and can signal completion of the table change. The microengine write function monitors each forwarding thread and sets its transition complete flag when all of its threads have transitioned. IB NP 221 monitors ITC indictor 422 and OTC indicator 423. When both are set, the transition is complete. IB NP 221 clears ITC indicator 422 and OTC indicator 423 and requests write access to the other bank through the memory state register. IB NP 221 then starts writing the other bank and the cycle continues with updates approximately every 100 milliseconds.

It is noted that threads may see the transition state (11) for multiple packets, while the transition completes in other threads. For this reason, the microengines do not change state each time the microengines see the transition state, but only if the microengines see a transition from a different state at the start of the previous packet to the transition state at the start of the current packet.

Construction of the forwarding structure is the responsibility of control plane processor (CPP) 310. The forwarding structure is composed of fours parts: 1) a CAM Key Set, 2) a Vector Table, 3) Trie Tree Tables, and 4) a set of Forwarding Descriptors, also known as Forwarding Table Entries. IB NP 221 accesses its own shared QDRAM and the shared QDRAM of OB NP 223 to simultaneously write the Vector Table and the Trie Tables for each network processor. Each network processor reads its own shared QDRAM banks for forwarding table lookups, thus avoiding memory contention during packet forwarding.

Each shared QDRAM is split into two banks, an upper bank and a lower bank, to allow writing the next set of forwarding tables in one bank while the other bank is being read for forwarding table lookups. The forwarding table entries (also called forwarding descriptors) are kept in the local RDRAM 431 and 441 of each network processor 221 and 223. CPP 310 is responsible for building these entries, writing the entries into its own RDRAM 431, and sending requests to CPP 320 to write them into RDRAM 441. CPP 320 simply writes the forwarding table entries into local RDRAM 441, as requested.

Figure 5:
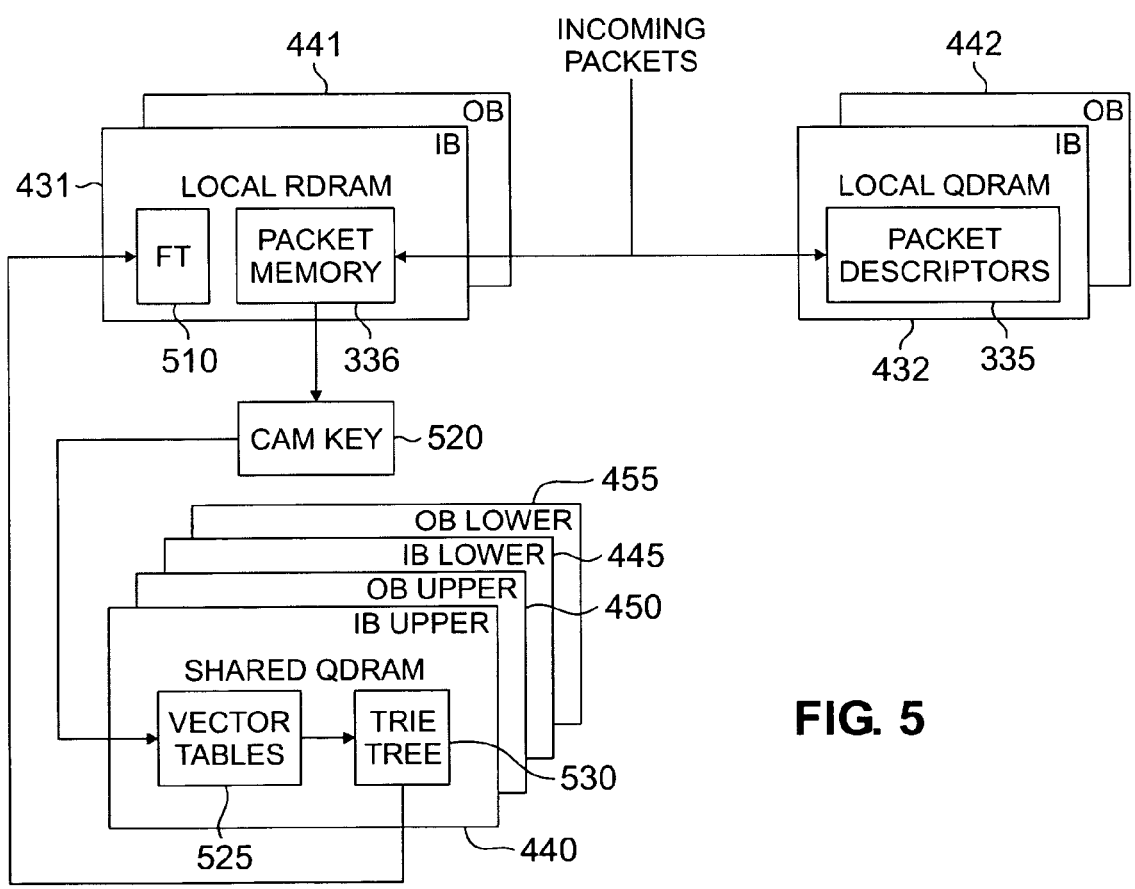
FIG. 5 illustrates the operation of the forwarding table architecture of a route processing module according to an exemplary embodiment of the present invention.

FIG. 5 illustrates the operation of the forwarding table architecture of exemplary route processing module 112 according to an exemplary embodiment of the present invention. Data packets enter RPM 112 through an interface (i.e., a network interface for IB NP 221 and a switch interface for OB NP 223). Each one of IB NP 221 and OB NP 223 also receives packets from CPP 310 and CPP 320, respectively. Microengines 222 and 224 place the data packets into packet memory 336 and packet memory 346 (not shown), located in local inbound (IB) RDRAM 431 and local outbound (OB) RDRAM 441, respectively. Microengines 222 and 224 also write to packet descriptor 335 and packet descriptor 345 in local IB QDRAM 432 and local OB QDRAM 442, respectively.

CAM key 520 is built from header information, such as portions of the destination address and QoS information, and a lookup operation in CAM 425 is done. The result of this lookup gives a pointer to an entry in vector tables 525, which points, in turn, to the start of a trie tree in trie tree structure 530. Other information from the packet header, such as the rest of the destination address, is used to traverse trie tree structure 530.

This search ultimately accesses either a leaf node or an invalid entry. Unresolved packets are either dropped or sent to control plane processor 310 (or 320). A leaf node gives a pointer to a forwarding table entry (or forwarding descriptor) in forwarding table 510. The data packet is forwarded based on the results of the search to the control plane, to the other network processor, or to an output port (i.e., a switch port for IB NP 221 and a network interface port for OB NP 223).

At processor start time, the initial trie tree structure 530 is constructed from a set of prior known static routes. Since there are no previous processed routes at this point, CAM key 520 is empty, there are no trie trees, and there are no forwarding descriptors. As each route is added, the appropriate CAM key entry is made (e.g., MPLS, IPv4, or IPv6). CAM 425 contains key-result pairs. As new entries are added to CAM 425, additional result values are consumed. The resultant value from the CAM search is an index value. This index value is the originally assigned value when the pair was added to CAM 425. The index value for a CAM key will not vary for the life of the entry. The index value is used to subscript into a vector table. The value at the vector table entry is a pointer to the top of the corresponding trie tree. This indirection is required because the tops of the trie trees are not guaranteed to be located at the same memory address from one construction iteration to the next.

CPP 310 builds the trie tree for each route. CPP 310 uses the subnet mask to determine the location of the leaf (i.e., to determine the depth of the search). CPP 310 marks the leaf node with a special code or flag and sets the leaf node to point to the forwarding table entry (or descriptor) for the route. The trie trees are stored in shared QDRAM memory 350. Each one of IB NP 221 and OB NP 223 has copies of the vector tables and the trie trees that are used to search for the forwarding table entry.

The end of a trie tree gives a forwarding descriptor. Forwarding descriptors are fixed in memory and do not change, but may be deleted. Forwarding descriptors are stored in RDRAMs that are local to each network processor. Since IB NP 221 is responsible for constructing the lookup tables, IB NP 221 must request OB NP 223 to put forwarding descriptors into the required locations in RDRAM 441. Trie trees are constructed by following the address path stored as part of the forwarding descriptor.

Once vector table 525 and trie tree structure 530 are constructed, IB NP 221 informs microengines 222 and 224 that a new vector table is available by setting state register 421 to 11. A reader thread on a microengine discovers this change. The reader thread in each network processor passes the change request on to each of the forwarding threads. The forwarding threads monitor for a table change at the beginning of each data packet, switch to the new table for the lookup of that packet if a table change is indicated, and inform the writer process that the forwarding threads have transitioned to the new table. A thread on the writer microengine of each network processor determines when all the forwarding threads have switched to the new routing set, at which time the writer thread informs the control plane of the completion of the switch by writing a transition complete indicator (i.e., ITC indicator 422 for IB NP 221 and OTC indicator 423 for OB NP 223).

One approach to signaling forwarding table swaps and handling vector table changes is the polling table swap technique described above, wherein microengine reader threads in IB NP 221 and OB NP 223 poll state register 421 in the FPGA complex looking for the transition state. With the polling method, when the forwarding table update application wants to swap in new tables, the forwarding table update application calls the Linux driver, which clears ITC indicator 422 and OTC indicator 423 and sets the state to [11] in the FPGA to signal a transition.

The reader threads in both IB NP 221 and OB NP 223 monitor state register 421. When the transition state [11] is seen, the reader thread in each network processor signals each of its forwarding threads to transition to the alternate tables in the other memory bank. Each forwarding thread monitors for table swap signals at the beginning of each data packet. If a table swap is signaled, each forwarding thread sends a signal to its writer thread indicating that a transition has occurred and begins forwarding the next packet using the new tables. When the writer thread detects that all its forwarding threads have transitioned to the new tables, the writer thread sets its transition complete indicator. The inbound writer thread sets ITC indicator 422 and the outbound writer thread sets OTC indicator 423. When the Linux driver finds both ITC and OTC indicators set, the Linux driver informs the forwarding table update application that the transition is complete. The application then selects state [10] or [01] to write the next set of tables.

The reader thread only signals the transition, when the reader thread sees a change from a state other than [11] to the state [11]. Thus, keeping the state at [11] does not cause continual table swaps. The signaling between the reader and writer threads and the forwarding threads takes the form of a flag for each forwarding thread. The reader thread sets each forwarding thread flag to signal a transition. The forwarding thread clears its flag to signal it has completed the transition.

This above method assumes that the base address of the vector table is in a fixed location in both the upper and lower banks of memory. This places a constraint on the memory maps, namely that the location of the vector tables cannot be changed. For example, increasing the sizes of these memory spaces could result in the need to change the starting addresses of the vector tables, which would force an update to the microengine code. Also, the above-described method forces the reader thread to keep track of current and previous states in FPGA state register 421 to prevent continual table swapping. Both IB NP 221 and OB NP 223 reader threads are monitoring the same state register, leading to possible contention problems.

These problems may be overcome by an address passing table swap technique according to the principles of the present invention. The address passing table swap technique does not fix the locations (addresses) of the upper and lower memory bank vector tables. Instead, the address passing table swap technique passes the vector table address to the reader thread in the microengine. This has the advantage of not tying the microengine code to a fixed memory map, relative to the locations of the vector tables. It also frees the reader thread from keeping state information on state register 421 to prevent continual table swapping and eliminates the contention related to having both the inbound and outbound network processor reader threads monitoring state register 421.

Figure 6:
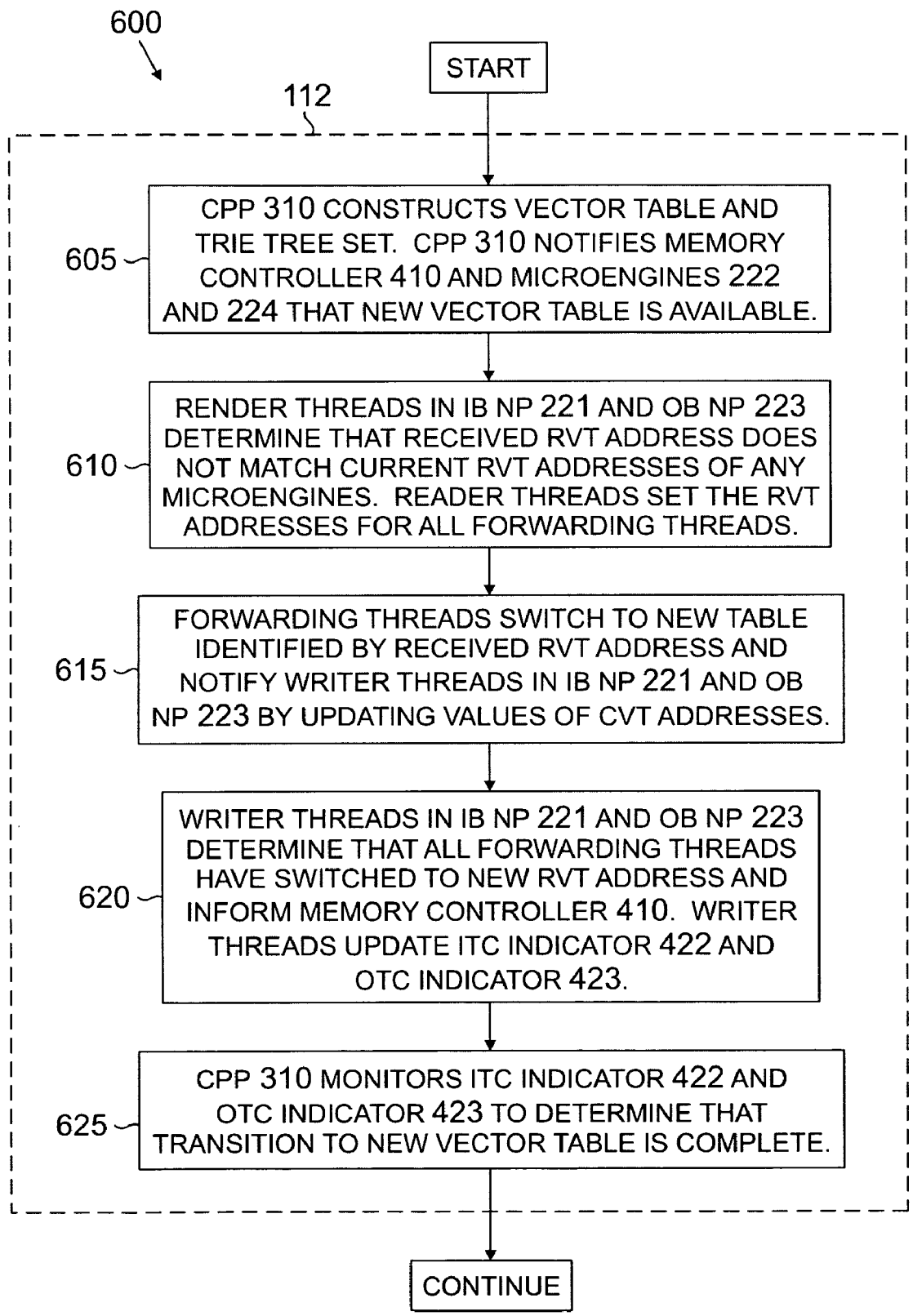
FIG. 6 is a flow diagram illustrating an address passing table swap technique according to one embodiment of the present invention.

FIG. 6 depicts flow diagram 600, which illustrates an address passing table swap technique according to one embodiment of the present invention. After CPP 310 constructs a vector table and trie tree set, the application program running in CPP 310 causes a Linux driver to notify memory controller 410, microengines 222 in IB NP 221, and microengines 224 in OB NP 223 that the new vector table is available (process step 605). This is done by setting state register 421 to [11], by clearing ITC indicator 422 and OTC indicator 423, and by sending the Requested Vector Table (RVT) address to the reader microengine in both IB NP 221 and OB NP 223.

The reader thread on the reader microengine in each one of IB NP 221 and OB NP 223 discovers this change by determining that the received RVT address does not match one of the $RVT_{ij}$ values in the microengine. The reader thread in each one of IB NP 221 and OB NP 223 sets the Requested Vector Table ($RVT_{ij}$) address for each of the forwarding threads in each microengine (Forwarding Thread$_{ij}$), where i is the microengine number and j is the thread number (process step 610).

The forwarding threads monitor for a table change at the beginning of each packet by looking for the Requested Vector Table ($RVT_{ij}$) address to be different from the Current Vector Table ($CVT_{ij}$) address. When a table switch is requested, the forwarding threads switch to the new table for forwarding the next packet and inform the writer process that the forwarding threads have transitioned to the new table by updating the Current Vector Table ($CVT_{ij}$) address (process step 615).

A thread on the writer (WRT) microengine of each one of IB NP 221 and OB NP 223 determines when all the forwarding threads have switched to the new Requested Vector Table (RVT) address, at which time the writer thread informs memory controller 410 (i.e., the FPGA) and control plane processors 310 and 320 of the completion of the switch (process step 620). The writer microengine does this by writing its transition complete indicator (i.e., ITC indicator 422 for IB NP 221 and OTC indicator 423 for OB NP 223). The Linux driver monitors ITC indicator 422 and OTC indicator 423. When both are set, the Linux driver informs the forwarding table update application executed by CPP 310 that the transition is complete (process step 625). Then CPP 310 can use the state register to select the banks to be written next.

Although the present invention has been described with an exemplary embodiment, various changes and modifications may be suggested to one skilled in the art. It is intended that the present invention encompass such changes and modifications as fall within the scope of the appended claims.

What is claimed is:

1. A router for interconnecting external devices coupled to said router, said router comprising:
   a switch fabric; and
   R routing nodes coupled to said switch fabric, wherein each of said R routing nodes are exchanging data packets with said external devices via network interface ports and with other ones of said R routing nodes via said switch fabric, wherein a first of said R routing nodes comprises:
   an inbound network processor receiving incoming data packets from a network interface port;
   an outbound network processor transmitting data packets to said network interface port; and
   a shared memory accessible by said inbound and outbound network processors for storing a current trie tree search table and a current vector table used to index into said current trie tree search table, wherein a control plane processor associated with said first routing node generates an updated vector table to replace said current vector table and notifying said inbound and outbound network processors that said updated vector table is available.

2. The router as set forth in claim 1, wherein said control plane processor notifies said inbound and outbound network processors that said updated vector table is available by sending an updated vector table address associated with said updated vector table to said inbound and outbound network processors.

3. The router as set forth in claim 2, wherein a first microengine in said inbound network processor determines that said updated vector table address is different than a current vector table address associated with said current vector table and, in response to said determination, uses said updated vector table identified by said updated vector table address to index into an updated trie tree search table.

4. The router as set forth in claim 3, wherein said first microengine executes a reader thread that determines that said updated vector table address is different than said current vector table address and, in response to said determination, causes a plurality of forwarding threads associated with said inbound network processor to use said updated vector table to index into said updated trie tree search table.

5. The router as set forth in claim 4, wherein a second microengine in said inbound network processor determines that said plurality of forwarding threads are using said updated vector table to index into said updated trie tree search table and, in response to said determination, notifies said control plane processor that said plurality of microengines are using said updated vector table and said updated trie tree search table to forward data packets.

6. The router as set forth in claim 2, wherein a first microengine in said outbound network processor determines that said updated vector table address is different than a current vector table address associated with said current vector table and, in response to said determination, uses said updated vector table identified by said updated vector table address to index into an updated trie tree search table.

7. The router as set forth in claim 6, wherein said first microengine executes a reader thread that determines that said updated vector table address is different than said current vector table address and, in response to said determination, causes a plurality of forwarding threads associated with said outbound network processor to use said updated vector table to index into said updated trie tree search table.

8. The router as set forth in claim 7, wherein a second microengine in said outbound network processor determines that said plurality of forwarding threads are using said updated vector table to index into said updated trie tree search table and, in response to said determination, notifies said control plane processor that said plurality of microengines are using said updated vector table and said updated trie tree search table to forward data packets.

9. A communication network comprising a plurality of routers that communicate data packets to one another and to interfacing external devices, each of said plurality of routers comprising:
   a switch fabric; and a plurality of routing nodes coupled to said switch fabric, wherein each of said plurality of routing nodes are exchanging data packets with said external devices via network interface ports and with other ones of said plurality of routing nodes via said switch fabric, wherein a first of said plurality of routing nodes comprises:
   an inbound network processor receiving incoming data packets from a network interface port;
   an outbound network processor transmitting data packets to said network interface port; and
   a shared memory accessible by said inbound and outbound network processors for storing a current trie tree search table and a current vector table used to index into said current trie tree search table, wherein a control plane processor associated with said first routing node generates an updated vector table to replace said current vector table and notifying said inbound and outbound network processors that said updated vector table is available.

10. The communication network as set forth in claim 9, wherein said control plane processor notifies said inbound and outbound network processors that said updated vector table is available by sending an updated vector table address associated with said updated vector table to said inbound and outbound network processors.

11. The communication network as set forth in claim 10, wherein a first microengine in said inbound network processor determines that said updated vector table address is different than a current vector table address associated with said current vector table and, in response to said determination, uses said updated vector table identified by said updated vector table address to index into an updated trie tree search table.

12. The communication network as set forth in claim 11, wherein said first microengine executes a reader thread that determines that said updated vector table address is different than said current vector table address and, in response to said determination, causes a plurality of forwarding threads associated with said inbound network processor to use said updated vector table to index into said updated trie tree search table.

13. The communication network as set forth in claim 12, wherein a second microengine in said inbound network processor determines that said plurality of forwarding threads are using said updated vector table to index into said updated trie tree search table and, in response to said determination, notifies said control plane processor that said plurality of microengines are using said updated vector table and said updated trie tree search table to forward data packets.

14. The communication network as set forth in claim 10, wherein a first microengine in said outbound network processor determines that said updated vector table address is different than a current vector table address associated with said current vector table and, in response to said determination, uses said updated vector table identified by said updated vector table address to index into an updated trie tree search table.

15. The communication network as set forth in claim 14, wherein said first microengine executes a reader thread that determines that said updated vector table address is different than said current vector table address and, in response to said determination, causes a plurality of forwarding threads associated with said outbound network processor to use said updated vector table to index into said updated trie tree search table.

16. The communication network as set forth in claim 15, wherein a second microengine in said outbound network processor determines that said plurality of forwarding threads are using said updated vector table to index into said updated trie tree search table and, in response to said determination, notifies said control plane processor that said plurality of microengines are using said updated vector table and said updated trie tree search table to forward data packets.

17. For use in a routing node comprising 1) an inbound network processor comprising a first plurality of microengines that forward incoming data packets from external ports to a switch fabric and 2) an outbound network processor comprising a second plurality of microengines that forward outgoing data packets from the switch fabric to the external ports, a method of switching between forwarding tables used by the first and second plurality of microengines comprising the steps of:

storing in a shared memory a current trie tree search table and a current vector table used to index into the current trie tree search table;
   generating an updated vector table to replace the current vector table; and
   notifying the inbound and outbound network processors that the updated vector table is available.

18. The method as set forth in claim 17, wherein the step of notifying the inbound and outbound network processors that the updated vector table is available comprises the sub-step of sending an updated vector table address associated with the updated vector table to the inbound and outbound network processors.

19. The method as set forth in claim 18, further comprising the step of determining in a first microengine in the inbound network processor that the updated vector table address is different than a current vector table address associated with the current vector table and, in response to the determination, using the updated vector table identified by the updated vector table address to index into an updated trie tree search table.

20. The method as set forth in claim 19, wherein the step of determining comprises the sub-step of determining in a reader thread executed in the first microengine that the updated vector table address is different than the current vector table address and further comprising the step, in response to the determination, of causing a plurality of forwarding threads associated with the inbound network processor to use the updated vector table to index into the updated trie tree search table.

* * * * *